United States Patent
Seok

(10) Patent No.: US 6,996,181 B2
(45) Date of Patent: Feb. 7, 2006

(54) MOTION ESTIMATION METHOD BY EMPLOYING A STOCHASTIC SAMPLING TECHNIQUE

(75) Inventor: Jinwuk Seok, Daejeon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 611 days.

(21) Appl. No.: 10/098,456

(22) Filed: Mar. 18, 2002

(65) Prior Publication Data
US 2003/0053542 A1    Mar. 20, 2003

(30) Foreign Application Priority Data
Aug. 29, 2001 (KR) ................ 2001-52380

(51) Int. Cl.
*H04N 7/12* (2006.01)
(52) U.S. Cl. ............ 375/240.16; 375/240; 375/240.01; 375/240.12
(58) Field of Classification Search ........... 375/240.17, 375/240, 240.01, 240.12, 240.16
See application file for complete search history.

(56) References Cited

U.S. PATENT DOCUMENTS

| | | | | |
|---|---|---|---|---|
| 5,488,419 A | * | 1/1996 | Hui et al. | 375/240.17 |
| 5,587,741 A | * | 12/1996 | Kim | 375/240.17 |
| 5,936,672 A | * | 8/1999 | Ahnn | 375/240.17 |

* cited by examiner

*Primary Examiner*—Allen Wong
(74) *Attorney, Agent, or Firm*—Mayer, Brown, Rowe & Maw LLP

(57) ABSTRACT

In a motion estimation method for use in encoding a moving picture, a full-pixel motion vector is estimated by stochastically sampling a pixel to be processed in a predetermined-sized block of a previous frame or a next frame as a reference frame for each of a plurality of equal-sized blocks in a current frame. Then, a half-pixel motion vector is estimated based on the full-pixel motion vector. Accordingly, both the calculation amount and the calculation time required for the motion estimation are effectively reduced. Further, it can be prevented that the hardware becomes complicated.

6 Claims, 3 Drawing Sheets

MOTION ESTIMATION METHOD BY EMPLOYING A STOCHASTIC SAMPLING TECHNIQUE

FIELD OF THE INVENTION

The present invention relates to a moving picture encoding technique; and, more particularly, to a method for estimating a motion vector by stochastically sampling pixels to be processed in a search block during a high-speed full-pixel searching process.

BACKGROUND OF THE INVENTION

In various electrical/electronic applications such as a video conference, a high definition television, a receiver for a video on demand (VOD), a personal computer compatible with an MPEG (moving picture experts group) image, a game machine, a receiver for a ground wave digital broadcast, a receiver for a digital satellite broadcast and a cable television, an image signal is transmitted in a digitized form. However, in the process of changing an analog signal into a digitized form, the amount of the data is greatly increased. For the reason, it is inevitable to compress the digitized image data for a successful transmission thereof.

To compress the digitized image data, three methods are conventionally used: one is a method for reducing a temporal redundancy of the data; another is a method for reducing a spatial redundancy of the data; and the third is a method for decreasing a statistical redundancy by using characteristic of generated encoded data. Particularly, to reduce the temporal redundancy of the image data, a motion estimation and compensation technique is widely used in the majority of motion picture compression standards, e.g., MPEG and H. 263.

In the motion estimation and compensation technique, a portion that is the most similar to a certain part in a current frame (hereinafter, a best matching portion) is searched out from a reference frame, e.g., a previous frame or a next frame. Then, only the difference value between the certain part in the current frame and the best matching portion in the previous or the next reference frame is transmitted. Herein, it is understood that a precise estimation of a motion vector will reduce the difference value that should be transmitted, thereby effectively diminishing the transmission data. However, a considerable amount of calculations and time are required in order to find the best matching portion in the previous or the next frame. In fact, the motion estimation is the most time-consuming stage of all the stages performed for the encoding of the motion picture. Accordingly, there has been continuously made an effort to reduce the processing time for the motion estimation.

In the meanwhile, the motion estimation technique adopts two approaches in general; one is a pixel-by-pixel approach and the other is a block-by-block approach. Among these, the block-by-block estimation algorithm has gained a prominent popularity in the art.

According to the block-by-block estimation algorithm, a current frame is divided into a plurality of equal-sized search blocks. For a search block in the current frame, a best matching block is searched out from a search region within a previous frame. A motion vector, by definition, represents a displacement between the search block and the best matching block. The motion vector is encoded and then processed. In estimating a degree of matching between two blocks, various matching functions are employed. Among these, a method for obtaining a sum of absolute difference (SAD) between pixels in the two blocks is widely used.

A full-region search method is the simplest block-by-block estimation technique, where a SAD value is calculated at all possible search positions within a search region of a certain search block in the current frame. Then, a search position having the smallest SAD value is selected to thereby obtain a corresponding motion vector. Though this full-region search method has a merit in that a search mechanism is simple and an optimum motion vector can be effectively obtained, a real-time application of this method is very difficult because the amount of calculations are excessively large.

As a resolution to the drawbacks of the full-region search method described above, an array-structured motion estimation apparatus has been utilized. The array-structured motion estimating apparatus employs a plurality of processing elements (PE) arranged in parallel to each other to obtain an SAD value.

In the array-structured motion estimation process, a plurality of operations, e.g., a full-pixel searching operation, a half-pixel searching operation, an intra/inter mode determining operation, etc., is performed. Among these various operations involved, the full-pixel searching operation is the most time-consuming process, occupying about 60% of the whole processing time. Further, the full-pixel searching operation has been included in almost all the moving picture related standards adopted so far. Thus, a more efficient full-pixel search algorithm has been a key to a realization of a real-time encoding of the moving pictures. Accordingly, many researches have been made in various ways to develop a high efficiency full-pixel estimation algorithm.

SUMMARY OF THE INVENTION

It is, therefore, an object of the present invention to provide a method for estimating a motion vector by stochastically sampling pixels to be processed in a search block during a high-speed full-pixel searching process, thereby enabling a high-speed search without causing deterioration in efficiency.

In accordance with the present invention, there is provided a motion estimation method for use in encoding a moving picture, comprising the steps of:

(a) estimating a full-pixel motion vector by stochastically sampling pixels to be processed in a predetermined-sized block of a reference frame for each of a plurality of equal-sized blocks in a current frame; and (b) estimating a half-pixel motion vector based on the full-pixel motion vector.

Preferably, in the present invention, the pixels in the predetermined sized block are sampled in the step (a) with the probability of 1/n (n being a positive integer larger than 1) for both an X-axis and a Y-axis.

BRIEF DESCRIPTION OF THE DRAWINGS

The above and other objects and features of the invention will become apparent from the following description of preferred embodiments given in conjunction with the accompanying drawings, in which.

DETAILED DESCRIPTION OF THE INVENTION

Figure 1:
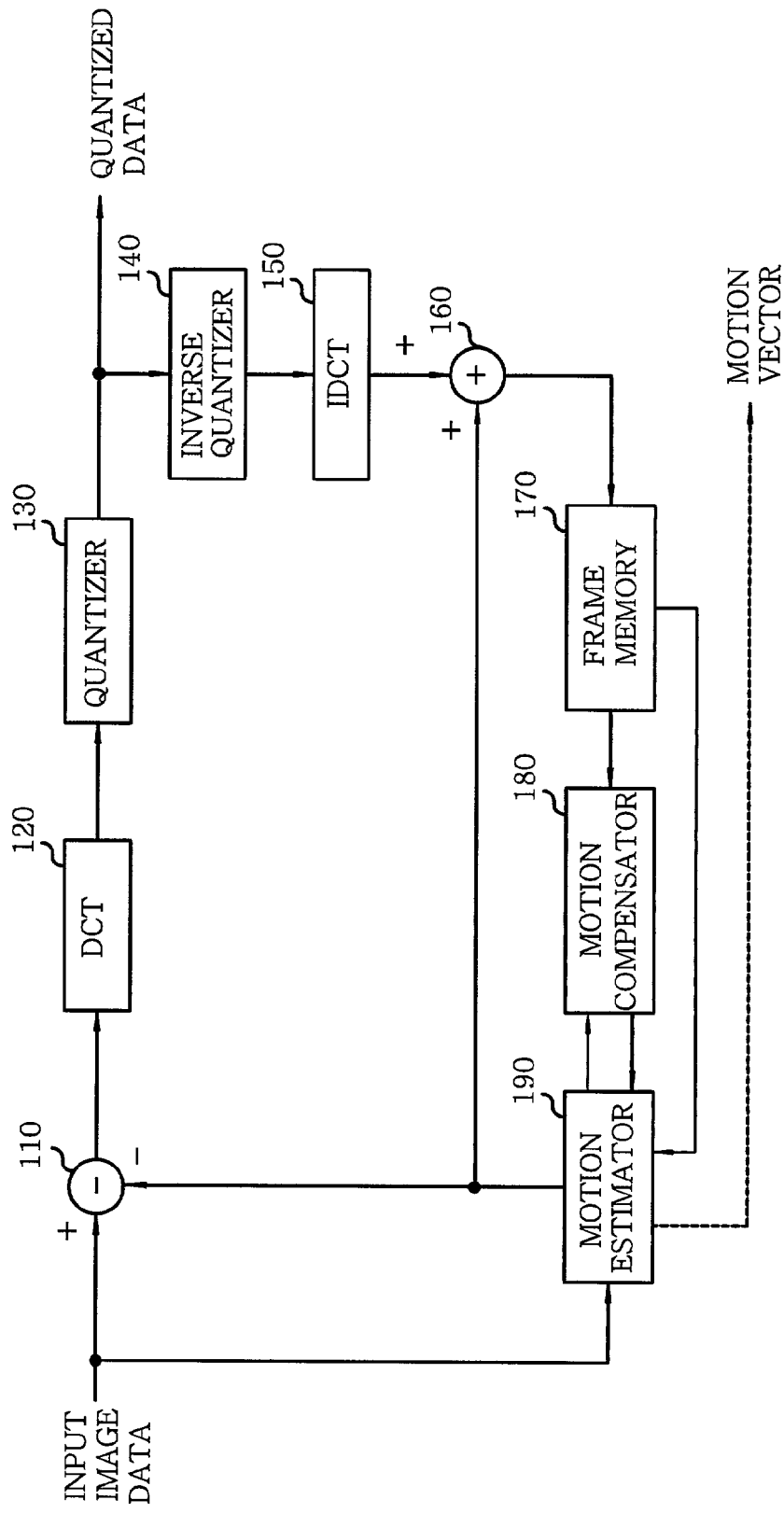
FIG. 1 shows a block diagram of a moving picture encoding apparatus in accordance with the present invention.

Referring to FIG. 1, there is shown a block diagram of a moving picture encoding apparatus. The moving picture encoding apparatus performs intra/inter-frame compressions in a sequence of an I-frame, a P-frame and a B-frame.

An I-frame pixel data as an input image data is transmitted to a discrete cosine transformation (DCT) circuit 120 without being affected by a subtractor 110 and to a motion estimator 190. Then, the DCT circuit 120 performs a discrete cosine transformation to the I-frame pixel data in a block-by-block basis of 8×8 pixels to thereby outputs a DCT data. Subsequently, the DCT data is quantized by a quantizer 130 to be outputted as a compressed I-frame data.

The compressed I-frame data from the quantizer 130 is inverse-quantized by an inverse quantizer 140 and, then, is subjected to an inverse discrete cosine transformation circuit 150 where an inverse discrete cosine transformation is performed to the inverse-quantized I-frame data so that the I-frame data is reconstructed. Thereafter, the reconstructed I-frame data is provided to an adder 160.

Without being affected by the adder 160, the reconstructed I-frame data is then transferred to a frame memory 170, which functions as a buffer, and is stored therein for a next predicted compression of the P-frame or the B-frame. The predicted compression process for the P-frame or the B-frame is similar to that of the I-frame compression process. The P-frame compression method will now be described hereinafter. The image frames stored in the frame memory 170 are provided to a motion estimator 190.

The motion estimator 190 calculates a motion vector by using both the image data currently being inputted thereto and the image data of the previous frame or the next frame as a reference frame stored in the frame memory 170. Then, the estimated motion vector is sent to a motion compensator 180.

The motion compensator 180 retrieves from the frame memory 170 a block corresponding to the estimated motion vector and, then, provides the retrieved block to the subtractor 110 and the adder 160 through the motion estimator 190. Then, the subtractor 110 subtracts on a pixel-by-pixel basis the retrieved block from an input image data, i.e., a block corresponding to a frame to be reconstructed. The difference or the residue obtained by the subtraction of the subtractor 110 is applied to the DCT circuit 120.

The compressed P frame from the DCT circuit 120 is decoded through the inverse quantizer 140 and the inverse-DCT circuit 150 in sequence. The decoded data is applied to a first input terminal of the adder 160. Concurrently, each block of the reference image frames stored in the frame memory 170 is accessed to predict the current frame. The accessed blocks are applied to a second input terminal of the adder 160 through the motion estimator 190.

The adder 160 adds the decoded data from the inverse DCT circuit 150 with the data outputted from the motion compensator 180 to reconstruct a real image. The P frame reconstructed by the adder 160 is stored in the frame memory 170 to be utilized later for the predicted encoding/decoding of the P-frame and the B-frame.

A variable length encoder (not shown) performs a statistical encoding process by performing a run-length encoding on the quantized data. Further, the variable length encoder multiplexes the statistically encoded data, the motion vector applied from the motion estimator 190 and additional information such as type information of a macro-block. Then, the multiplexed data is sent to a buffer (not shown) and is temporarily stored therein before outputted. The buffer adjusts a bit rate of the multiplexed image data.

Figure 2:
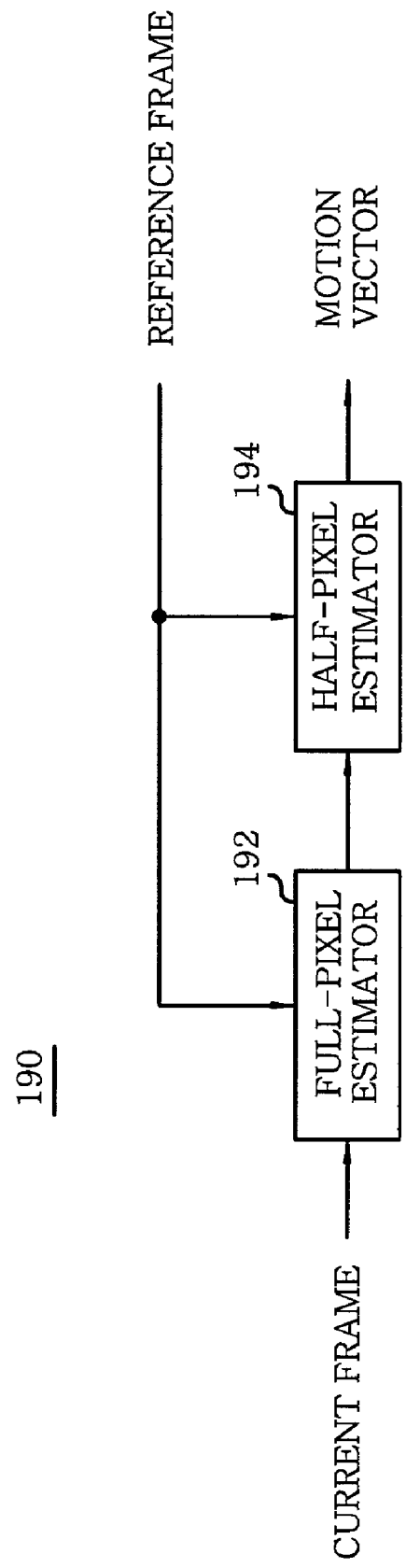
FIG. 2 provides a block diagram of a motion estimator shown in FIG. 1 in accordance with a preferred embodiment of the present invention.

Referring to FIG. 2, there is represented a block diagram of the motion estimator 190 shown in FIG. 1 in accordance a preferred embodiment of with the present invention. The motion estimator 190 includes a full-pixel estimator 192 for detecting a motion vector on a full-pixel basis and a half-pixel estimator 194 for detecting an optimum motion vector on a half-pixel basis based on the obtained full-pixel motion vector.

The full-pixel estimator 192 divides a current frame to be compressed into a plurality of macro blocks and estimates a full-pixel motion vector for the current frame within a search region of a previous or a next frame as a reference frame by using a full-pixel motion estimation method to be described later. Then, the full-pixel estimator 192 outputs an estimated full-pixel motion vector.

The half-pixel estimator 194 estimates an optimum half-pixel motion vector on the basis of the estimated full-pixel motion vector.

A stochastic sampling by employing a full-pixel estimation method in accordance with a preferred embodiment of the present invention will now be described hereinafter.

First, the difference between the present invention and the prior art will be explained for easy understanding of the present invention.

Conventionally, a SAD value is obtained as follows. First, the differences between pixels in a certain portion of the current frame and pixels in a certain part of the previous frame are obtained by successively substituting those pixels to an estimation unit along an X-axis and a Y-axis. If a code bit of a most significant bit is "1", the code bit is changed into one's complement to obtain an absolute value of one pixel. Then, by accommodating the obtained absolute values of the pixels, the SAD is finally obtained.

In accordance with the present invention, however, the pixels in the certain block are sampled by using a probability of ½ for both X-axis and Y-axis and, then, the sampled pixels are inputted to an estimation unit. Thus, the estimation amount is reduced by ¼, so that a high-speed full-pixel search is realized. If the certain block has a size of 16×16 pixels, 8×8 pixels are stochastically sampled so that the estimations for the total of 256 pixels are reduced by ¼ to the estimations for only 64 pixels.

Figure 3A:
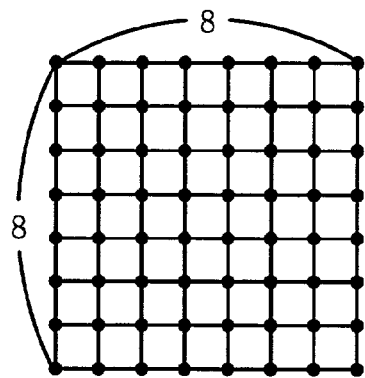
FIG. 3 presents a diagram for use in describing a process for sampling pixels in a search block by using a predetermined probability in accordance with a preferred embodiment of the present invention.
Figure 3B:
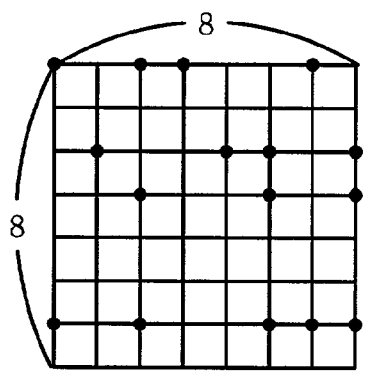
Figure 3C:
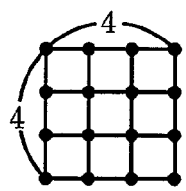

As illustrated in FIG. 3B, estimation points are sampled in a block having a size of 8×8 as shown in FIG. 3A with the probability of ½ for both the X-axis and the Y-axis. Thus, the number of calculation points for the block of 8×8 pixels becomes identical with that for a block having a size of 4×4.

In order to select or sample the pixels with the probability of ½, a stochastic variable which has the probability of ½ as a value of 1 is required. To obtain such a stochastic variable, a various method can be adopted. For instance, a pseudo random number generator or a method for storing a random number table in a memory may be utilized. Alternatively, a least significant bit (LSB) of pixels to be processed can be employed, using the characteristic of a binary data.

$$R(t+1)=R(t)+r+c+1,\ C(t+1)=C(t)+r+c+1 \quad \text{Equation (1)}$$

In the above equation (1), r represents a probability variable for use in selecting or sampling a pixel on the X-axis, wherein the probabilities of r being "1" and "0" are respectively ½; c represents a probability variable for use in sampling a pixel on the Y-axis, wherein the probabilities of c being "1" and "0" are respectively ½. R(t) and C(t) represents a rotation coefficient of a currently sampled pixel on the X-axis and on the Y-axis, respectively. Each of R(t+1) and C(t+1) represents a location coefficient of a pixel to be sampled next.

By using the equation (1), it is found that the probability of sampling a pixel on the X-axis which is increased by 1 from R(t) is ¼; the probability of sampling a pixel on the X-axis which is increased by 2 from R(t) is ½; and the probability of sampling a pixel on the X-axis which is increased by 3 from R(t) is ¼.

$$1x+2y+3z=16 \qquad \text{Equation (2)}$$

$$AV = (x+y+z) \cdot {}_{x+y+z}C_{y\,x+z}C_x \left(\frac{1}{4}\right)^x \left(\frac{1}{2}\right)^y \left(\frac{1}{4}\right)^z \qquad \text{Formula (3)}$$

In the above equation (2) and the formula (3), x represents a number of cases where the sum of the probability variables r and c is 0; y represents a number of cases where the sum of r and c is 1; and z represents a number of cases where the sum of r and c is 2. Under the restriction of the equation (2), the average value (AV) is obtained by using the formula (3). Accordingly, if the present invention is applied to a block having a size of 16×16 pixel, a block with a size of 8×8 pixel is obtained, thereby reducing the amount of calculations by ¼.

Further, the present invention has a hill climbing effect which is a representative algorithm for avoiding a local minimum point.

As described above, since an average of 8×8 block operations are performed for the 16×16 block, if the present invention is applied to a pixel s(xy) (t−1) in a previous frame corresponding to a pixel s(xy)(t) of a current coordinate (x,y), the SAD value is obtained by using the following equation.

$$\sum_x^N \sum_y^N [s(x,y)(t) - s(x,y)(t-1) \cdot I(x,y)] = \qquad \text{Equation (4)}$$

$$\frac{1}{4} \sum_x^N \sum_y^N [s(x,y)(t) - s(x,y)(t-1)] + \varepsilon(t)$$

Herein, N represents a number of pixels on the X-axis or the Y-axis in a block and I(x,y) represents a characterizing function for designating whether the pixel in the current coordinate (x,y) is sampled or not, the I(x,y) having a value of 1 when the (x,y) is sampled while having a value of 0 when the (x,y) is not sampled. Thus, if the search process is performed through the comparisons of original SAD values, the hill climbing effect is generated as illustrated in the following equation (5), such that it can be prevented that the search result is found to be the local minimum point.

$$\frac{1}{4} \sum_x^N \sum_y^N [s(x,y)(t) - s(x,y)(t-1)] + \varepsilon(t) - \qquad \text{Formula (5)}$$

-continued $$\frac{1}{4} \sum_x^N \sum_y^N [s(x,y)(t) - s(x,y)(t-1)] + \varepsilon(t) \langle 0$$

$$\Rightarrow \frac{1}{4} \sum_x^N \sum_y^N [s(x,y)(t) - s(x,y)(t-1)] -$$

$$[s(x,y)(t-1) - s(x,y)(t-2)]\langle \varepsilon(t-1) - \varepsilon(t)$$

$$\Rightarrow \frac{1}{4} \sum_x^N \sum_y^N [s(x,y)(t) - s(x,y)(t-1)] - [s(x,y)(t-1) -$$

$$s(x,y)(t-2)]\langle \beta(t)$$

As described above, the present invention provides a method for readily obtaining an SAD value by stochastically sampling a pixel for an SAD operation during a full-pixel motion estimation process for use in all standards of MPEG (MPEG-1, MPEG-2 and MPEG-4) and a moving picture standard of ITU (H.261 and H.263). Accordingly, both the calculation amount and the calculation time required for the motion estimation are effectively reduced. Further, it can be prevented that the hardware becomes complicated.

While the invention has been shown and described with respect to the preferred embodiments, it will be understood by those skilled in the art that various changes and modifications may be made without departing from the spirit and scope of the invention as defined in the following claims.

What is claimed is:

1. A motion estimation method for use in encoding a moving picture, comprising:
    (a) estimating a full-pixel motion vector by stochastically sampling pixels to be processed in a predetermined-sized block of a reference frame for each of a plurality of equal-sized blocks in a current frame; and
    (b) estimating a half-pixel motion vector based on the full-pixel motion vector,
    wherein the pixels in the predetermined-sized block in the step (a) are sampled by using the following equation:

$R(t+1)=R(t)+r+c+1, C(t+1)=C(t)+r+c+1,$ wherein r represents a probability variable for use in sampling a pixel on the X-axis,
    wherein the probabilities of r being "1" and "0" are respectively ½;
    wherein c represents a probability variable for use in sampling a pixel on the Y-axis;
    wherein the probabilities of c being "1" and "0" are respectively ½;
    wherein R(t) and C(t) represents a rotation coefficient of a currently sampled pixel on the X-axis and on the Y-axis. respectively; and
    wherein each of R(t+1) and C(t+1) represents a location coefficient of a pixel to be sampled next.

2. The method of claim 1, wherein the pixels in the predetermined sized block are sampled in the step (a) with the probability of 1/n (n being a positive integer larger than 1) for both an X-axis and an Y-axis.

3. The method of claim 2, wherein the pixels in the predetermined-sized block are sampled in the step (a) with the probability of ½ for both the X-axis and the Y-axis.

4. The method of claim 1, wherein a sum of absolute difference of a pixel s(xy)(t−1) in a previous frame corresponding to a pixel s(xy) (t) of a current coordinate (x,y) is obtained by the following equation:

$$\sum_{x}^{N}\sum_{y}^{N}[s(x,y)(t)-s(x,y)(t-1)\cdot I(x,y)] =$$

$$\frac{1}{4}\sum_{x}^{N}\sum_{y}^{N}[s(x,y)(t)-s(x,y)(t-1)]+\varepsilon(t)$$

wherein N represents a number of pixels on the X-axis or on the Y-axis in a block and I(x,y) represents a characterizing function for showing whether the pixel in the current coordinate (x,y) is sampled or not.

5. A motion estimation method for use in encoding a moving picture, comprising:
(a) estimating a full-pixel motion vector by stochastically sampling pixels to be processed in a predetermined-sized block of a reference frame for each of a plurality of equal-sized blocks in a current frame; and
(b) estimating a half-pixel motion vector based on the full-pixel motion vector,
wherein the pixels in the predetermined-sized block are sampled in the step (a) with the probability of ½ for both the X-axis and the Y-axis,
wherein the pixels in the predetermined-sized block in the step (a) are sampled by using the following equation:

R(t+1)=R(t)+r+c+1, C(t+1)=C(t)+r+c+1, wherein r represents a probability variable for use in sampling a pixel on the X-axis,
wherein the probabilities of r being "1" and "0" are respectively ½;
wherein c represents a probability variable for use in sampling a pixel on the Y-axis;
wherein the probabilities of c being "1" and "0" are respectively ½;
wherein R(t) and C(t) represents a rotation coefficient of a currently sampled pixel on the X-axis and on the Y-axis, respectively; and
wherein each of R(t+1) and C(t+1) represents a location coefficient of a pixel to be sampled next.

6. A motion estimation method for use in encoding a moving picture, comprising:
estimating a full-pixel motion vector by stochastically sampling pixels to be processed in a predetermined-sized block of a reference frame for each of a plurality of equal-sized blocks in a current frame; and
estimating a half-pixel motion vector based on the full-pixel motion vector,
wherein a sum of absolute difference of a pixel s(xy)(t−1) in a previous frame corresponding to a pixel s(xy)(t) of a current coordinate (x,y) is obtained by the following equation:

$$\sum_{x}^{N}\sum_{y}^{N}[s(x,y)(t)-s(x,y)(t-1)\cdot I(x,y)] =$$

$$\frac{1}{4}\sum_{x}^{N}\sum_{y}^{N}[s(x,y)(t)-s(x,y)(t-1)]+\varepsilon(t)$$

wherein N represents a number of pixels on the X-axis or on the Y-axis in a block and I(x,y) represents a characterizing function for showing whether the pixel in the current coordinate (x,y) is sampled or not.

* * * * *